March 29, 1949.　　　　　F. S. WEINIG　　　　　2,465,409
SHROUD LINE LOAD SUSPENSION SYSTEM
FOR RIBBON PARACHUTES
Filed April 9, 1948　　　　　　　　　　3 Sheets-Sheet 3

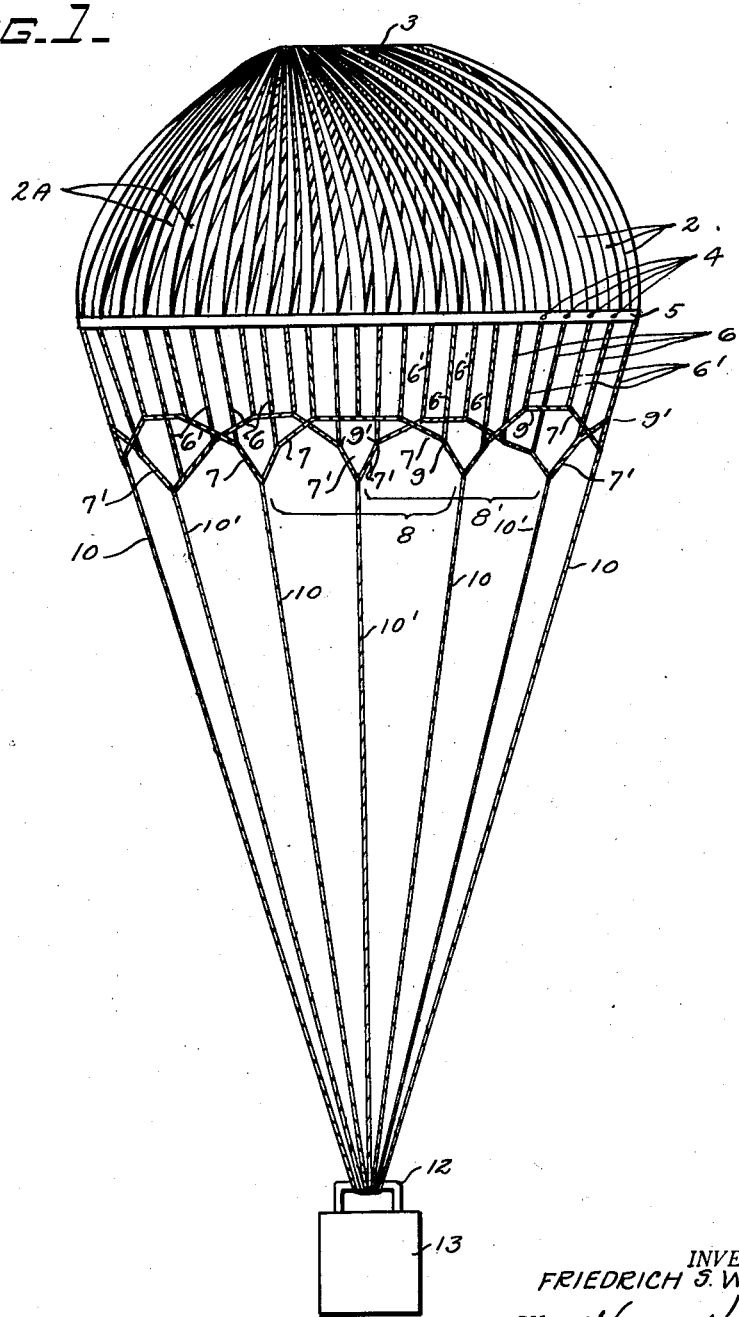

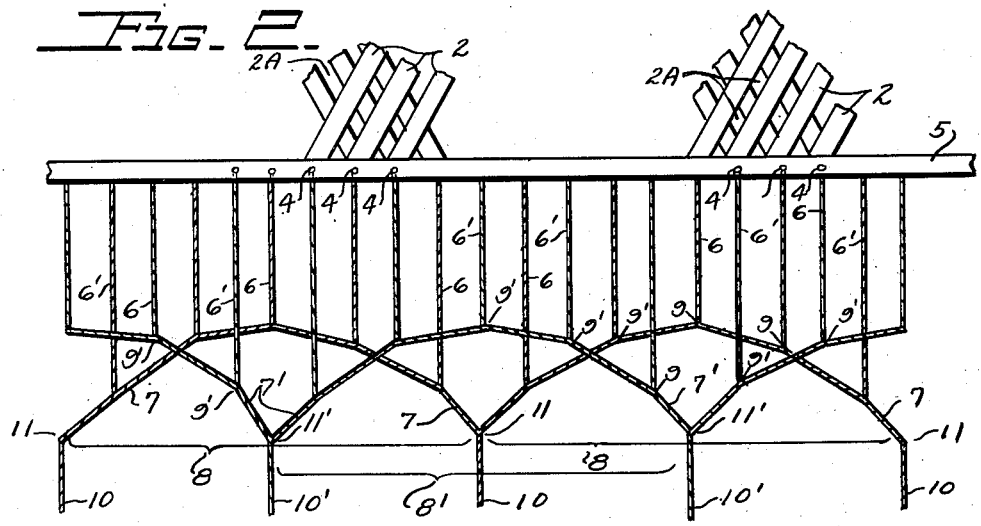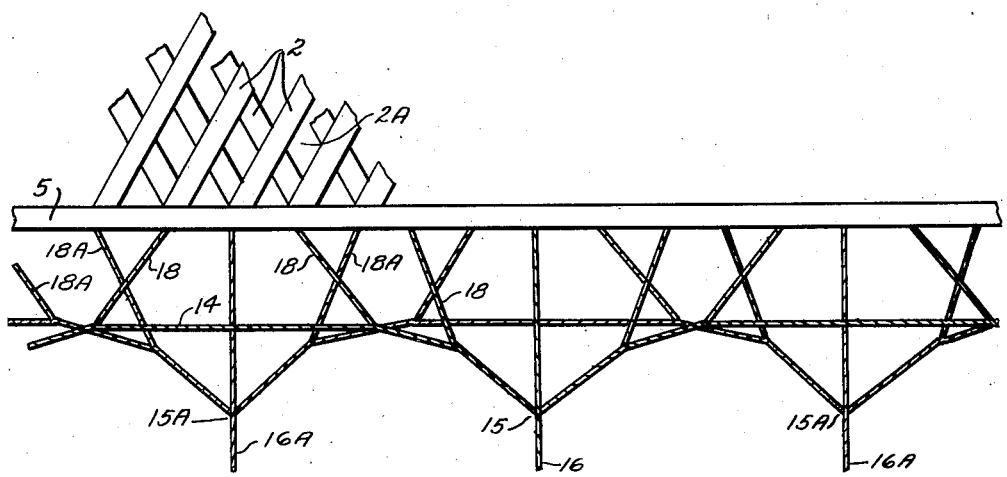

INVENTOR.
FRIEDRICH S. WEINIG
BY Wade Koontz AND
Charles H. Wagner
ATTORNEYS

Patented Mar. 29, 1949

2,465,409

UNITED STATES PATENT OFFICE 2,465,409

SHROUD LINE LOAD SUSPENSION SYSTEM FOR RIBBON PARACHUTES

Friedrich S. Weinig, Stuttgart-Moehringen, Germany

Application April 9, 1948, Serial No. 20,118

5 Claims. (Cl. 244—145)

(Granted under the act of March 3, 1883, as amended April 30, 1928; 370 O. G. 757)

The invention described herein may be manufatured and used by or for the Government for governmental purposes without payment to me of any royalty thereon.

This invention relates to parachutes generally and more particularly to parachute suspension line systems between the canopy and the load suspension means below the canopy.

An object of the present invention is the provision of an improved type of suspension or shroud line arrangement which affords a much greater factor of safety in the connection between the canopy and the connected load to be lowered by the canopy than has been formerly employed.

A further object is the provision of a dual suspension system between the canopy and the load for increasing the strength, flexibility and safety factor of the shroud line suspension system without materially increasing the weight or amount of material utilized.

A still further object is the provision of a dual suspension shroud line system designed to distribute the load to be suspended and lowered by a ribbon parachute uniformly and evenly to a multitude of closely and uniformly spaced points around the lower edge of the canopy skirt, so arranged that in the event of failure of one of the dual shroud lines supporting systems the other system will support the load with the stresses evenly distributed around the lower edge portion of the canopy skirt.

Other objects and advantages of the invention will become apparent from the following description taken in connection with the accompanying drawings in which like reference characters refer to like parts in the several figures.

Fig. 1 is a somewhat diagrammatic view of a ribbon parachute employing my improved dual load suspension shroud line system.

Fig. 2 is an enlarged fragmentary plan view of the skirt portion of a ribbon parachute canopy illustrating diagrammatically the dual shroud line suspension system in which the primary and secondary shroud lines are disposed in radial planes passing through the descent axis of the canopy.

Fig. 3 is a view somewhat similar to Fig. 2 but disclosing the upper shroud lines extending in different angular relations to each other.

Figure 4:
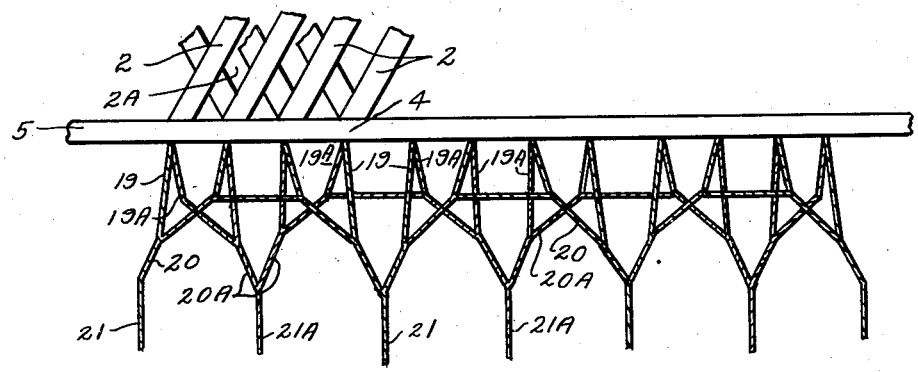
Fig. 4 is a view similar to Fig. 2 but showing a slightly modified shroud line arrangement.

Referring more particularly to Fig. 1 the reference numeral 1 indicates a ribbon parachute canopy of substantially hemispherical shape, composed of relatively narrow ribbons 2—2 or strips of material extending across the top of a canopy in oblique crossing relation to each other at opposite sides of a central vent or apex opening 3 with the opposite ends of the ribbons connected together in pairs at points 4—4, equally spaced around the base or lower edge of the canopy skirt.

An annular reinforcing band 5 extends around the lower edge of the canopy and the overlapping ends of the pairs of ribbons 2—2 are preferably connected to this band at the points 4—4. The openings between the ribbons are rhombic in shape, indicated at 2A and are distributed substantially throughout the canopy area to provide permeability and reduce oscillation when the canopy is released at high speeds.

At the juncture of each pair of ribbons or at each of the equally spaced points 4—4 around the lower edge of the canopy skirt there is secured at least one upper shroud line 6, and in one form of my invention, later to be described, the ends of each pair of the ribbons 2 has a pair of upper shroud lines 19 and 19A connected thereto and depending downwardly therefrom.

At a suitable distance below the base or lower edge of the skirt of the canopy and concentric to the vertical descent axis of the parachute a plurality of annular load sustaining cables or bolt ropes 7 and 7' are provided. These bolt ropes 7 and 7' are formed with a plurality of adjoining uniformly spaced arched portions or inverted substantially catenary curved portions 8 and 8'. The lower ends of the upper shroud lines 6, and 6' or 19 and 19A, are alternately connected to these annular bolt ropes 7 and 7' at a plurality of points 9 and 9' preferably distributed substantially uniformly along the bolt ropes between the opposite ends of the inverted catenary portions. Lower shroud lines 10 and 10' are connected respectively to the bolt ropes 7 and 7' at the junctures 11 and 11' between the adjoining ends of the inverted catenary portions 8 and 8', the lower ends of the shroud lines 10 and 10' converging downwardly and secured at 12 to the load 13 which is to be lowered by the parachute.

The adjoining ends of the inverted catenary portions 8 of the bolt rope 7 are preferably positioned intermediate, or substantially midway between the opposite ends of the inverted catenary portions 8' of the other bolt rope 7'.

In the construction shown in Fig. 2 of the drawings the alternate upper shroud lines 6 and 6' converge downwardly respectively to the bolt ropes 7 and 7' and are connected thereto, the upper shroud lines being all disposed in radial planes passing through the central or vertical descent axis of the canopy and the downward pull or stress on the ends of each of the pairs of ribbons which are connected to the upper ends of the upper shroud lines in a substantially vertical plane. Half of the load is distributed throughout the canopy to every other or alternate pair of ribbons and the alternate upper shroud lines and one of the bolt ropes while the remainder of the canopy load is distributed to the balance of the ribbons and to the other shroud lines and the other bolt rope. In the event of failure of one or more of the upper shroud lines, or a rupture of one of the bolt ropes there are two upper shroud lines one on each side of every other shroud line that might fail which would take up the load stresses and distribute such stresses uniformly to the other bolt rope and through its connected lower shroud lines to the suspended load 13. This arrangement permits the utilization of a somewhat lighter and more flexible type of shroud line and the annular bolt ropes may also be lighter making the system more durable, flexible and secure against total failure. It is therefore possible to provide a greater safety factor without a material increase in weight and a parachute incorporating my improved dual or alternate load suspension arrangement would "pack" at least as easily and conveniently as the conventional single suspension system and in all probability it would be "stowed" in a parachute pack and worn with much greater ease.

Fig. 3 discloses a slightly modified dual load suspension system which also employs the adjoining inverted dual catenary cables or arched portions 14 and 14A and arranged with their adjacent ends 15 and 15A in relatively staggered relation as before, the lower shroud lines 16 and 16A being connected thereto and extending downwardly for connection to the suspended load not shown. The upper shroud lines 18 and 18A however are not disposed in radial planes passing through the descent axis of the canopy as disclosed in Figs. 1 and 2. They incline downwardly to the bolt ropes from the ends of alternate pairs of ribbons in relatively crossed angular relation to each other. The shroud lines which are connected to the intermediate portions of each of the inverted catenaries incline downwardly from the lower edge of the skirt to the bolt ropes in a direction extending toward the nearest ends of the adjoining catenary portions. One upper shroud line however extends in a vertical plane from each point of connection between the lower shroud lines and the bolt ropes to the lower ends of each pair of ribbons directly above.

In Fig. 4 each pair of ribbons have a pair of upper shroud lines 19 and 19A connected thereto and extending downwardly at a slight angle to each other. The inverted catenary portions or adjacent arched portions of the two bolt ropes are indicated at 20 and 20A and are arranged below the canopy concentric to the vertical descent axis thereof with the adjacent ends of the depending lower shroud lines 21 disposed intermediate the opposite ends of the arched portions 20A and the other depending lower shroud lines 21A. Every other or alternate upper shroud line 19 is connected at its lower end to one of the bolt ropes in point along the arched portions 20 while the ends of the other upper shroud lines 19A are connected at point along the arched portions 20A of the other shroud line. In this form of the invention no upper shroud lines run directly from the juncture of the adjacent ends of the arched portions of the bolt ropes to points on the skirt portion of the canopy located directly above.

Figure 5:
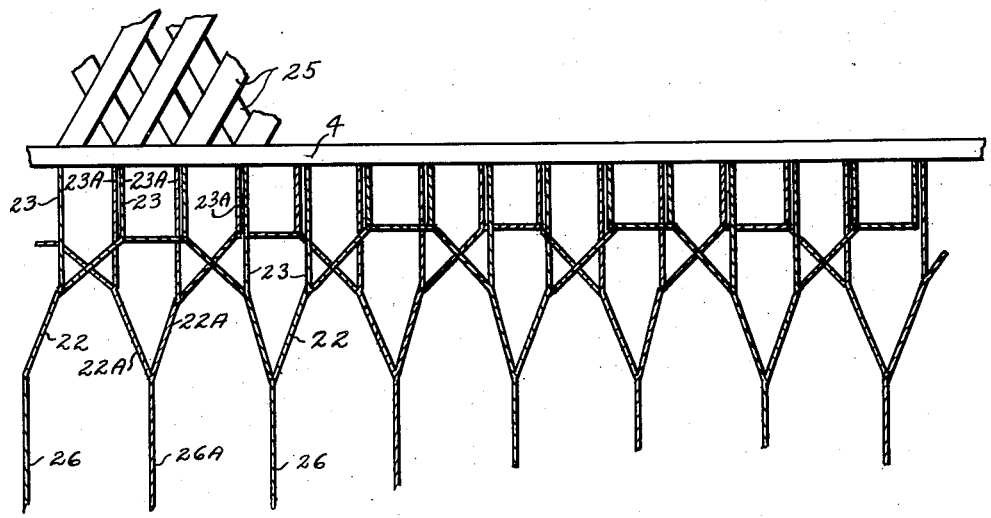
Fig. 5 is a view similar to Fig. 2, disclosing an arrangement in which the dual shroud line system employs two upper shroud lines extending from the adjoining ends of each pair of the ribbons.

Fig. 5 is a modified structure which is quite similar to Fig. 4, except that the arched portions 22 and 22A are deeper and the pairs of upper shroud lines 23 and 23A which extend down from the connected ends of each pair of load sustaining ribbons 25 are located in vertical planes passing through the vertical descent axis of the canopy. The shroud lines 26, 26A which are connected to the lower or adjoining ends of the inverted catenaries or arched portions 22 and 22A also extend downwardly toward the load suspension ends, not shown, to which the load to be carried by the chute is secured. In the utilization of the parachute, should a breakage of one of the shroud lines or bolt ropes occur, the other shroud lines become immediately effective to support the load without changing its distribution to the edge of the canopy. This is important in connection with ribbon parachutes since the load and stresses which are applied to the ends of the ribbons must be substantially uniform in order to maintain the ribbons properly tensioned and in place in the canopy structure.

The embodiments shown and described are for exemplary purposes and it is obvious that changes may be made in the construction and arrangement of parts shown and described without departing from the spirit of the invention as defined in the accompanying claims.

I claim:

1. In a parachute of the class described, a canopy having a skirt portion formed of a multitude of load sustaining ribbons extending across each other throughout the canopy area with their ends located at points spaced equally around the skirt portion, a multitude of upper shroud lines connected to the canopy at said equally spaced points and extending downwardly, a plurality of bolt ropes located in substantially spaced relation to and below the canopy skirt portion, each bolt rope having a plurality of similar inverted adjoining catenary curved portions uniformly distributed throughout its length and connected to each of alternate upper shroud lines at their lower ends, and lower shroud lines connected to and extending downwardly from the adjacent ends of the inverted catenary portions of each of the bolt ropes with their lower ends secured for connection with a load to be lowered by the parachute.

2. In a ribbon parachute, a substantially hemispherical canopy formed of relatively narrow load sustaining ribbons extending across the canopy from side to side in oblique crossing relation throughout the canopy area to form a multitude of rhombic shaped air escape openings, the ends of the ribbons extending to the lower edge of the canopy and connected together in pairs at points equally spaced around the said lower edge, a multitude of upper shroud lines connected to the pairs of ribbons at said equally spaced points and extending downwardly, a plurality of annular bolt ropes located below the canopy in planes substantially parallel to the lower edge of the canopy, each bolt rope having a plurality of equally spaced adjoining inverted substantially catenary portions throughout the length of the bolt rope, said bolt ropes each being connected throughout its length to the lower ends of alternate upper shroud lines, parachute load suspension means concentrically disposed below the canopy for lowering a load to be supported by the canopy, and lower shroud lines connected to said parachute load suspension means and converging downwardly from the end portions of all of said inverted catenary portions of said bolt ropes to said load suspension means.

3. In a ribbon parachute, a canopy having a vertical descent axis and formed of load sustaining ribbons extending in relative angular crossing relation to each other throughout the canopy area with their ends secured together in pairs at points on opposite sides of the canopy and spaced uniformity around the base of the canopy, upper shroud lines secured to the base of the canopy at said equally spaced points and extending downwardly, a pair of annular bolt ropes extending concentrically around the descent axis of the canopy below and substantially spaced from the base of the canopy, said upper shroud lines being alternately connected at their lower ends to each of said bolt ropes, a plurality of lower shroud lines connected at equally spaced points throughout the length of each of said bolt ropes and extending downwardly, load suspension means below the canopy concentric to its vertical descent axis for lowering a load suspended by the canopy, and a connection between the lower ends of each of said lower shroud lines and said load suspension means.

4. In a parachute having a substantially hemispherical canopy with a central vertical descent axis and an annular skirt portion, a multitude of upper shroud lines connected to said skirt portion at a multitude of points equally spaced around the periphery of the skirt portion and depending downwardly, a pair of annular bolt ropes concentrically arranged relative to said vertical descent axis in spaced relation to the lower edge of the skirt portion and arranged adjacent to each other, each bolt rope having a plurality of inverted substantially uniform adjoining catenary curved portions equally spaced throughout its length with the adjoining ends of the inverted catenary portions of one bolt rope disposed substantially midway between the opposite ends of the inverted catenaries of the other bolt rope, said upper shroud lines being alternately connected at their lower ends to each of the bolt ropes at points intermediate the adjoining ends of said inverted catenary portions, load suspension means concentrically disposed below the canopy substantially on the descent axis thereof for suspending a load thereto to be lowered by the parachute, and lower shroud lines connected at their upper ends to the bolt ropes at the adjoining ends of the inverted catenary portions and converging downwardly and connected at their lower ends to said load suspension means.

5. In a parachute of the class described, a canopy having an annular skirt portion, a plurality of pairs of upper shroud lines, each pair connected to the skirt portion at one of a multitude of points equally spaced around a lower edge of the skirt portion and depending downwardly, a pair of annular bolt ropes extending around the canopy in spaced relation thereto below the skirt portion, in side by side relation to each other, a fixed connection between the lower ends of each pair of said upper shroud lines and each of said bolt ropes, said bolt ropes each having a plurality of adjoining inverted catenary curved portions throughout its length with the adjoining ends of the catenary curved portions of one bolt rope disposed intermediate the opposite ends of the inverted catenary curved portions of the other bolt rope, load suspension means concentrically disposed below the center of the canopy and said bolt ropes for suspending a load to be lowered by the parachute, and a plurality of lower shroud lines connected at their lower ends to said load suspension means and alternately connected at their upper ends to each of said bolt ropes at the adjacent ends of said adjoining inverted catenary curved portions.

FRIEDRICH S. WEINIG.

No references cited.